Figure 1:
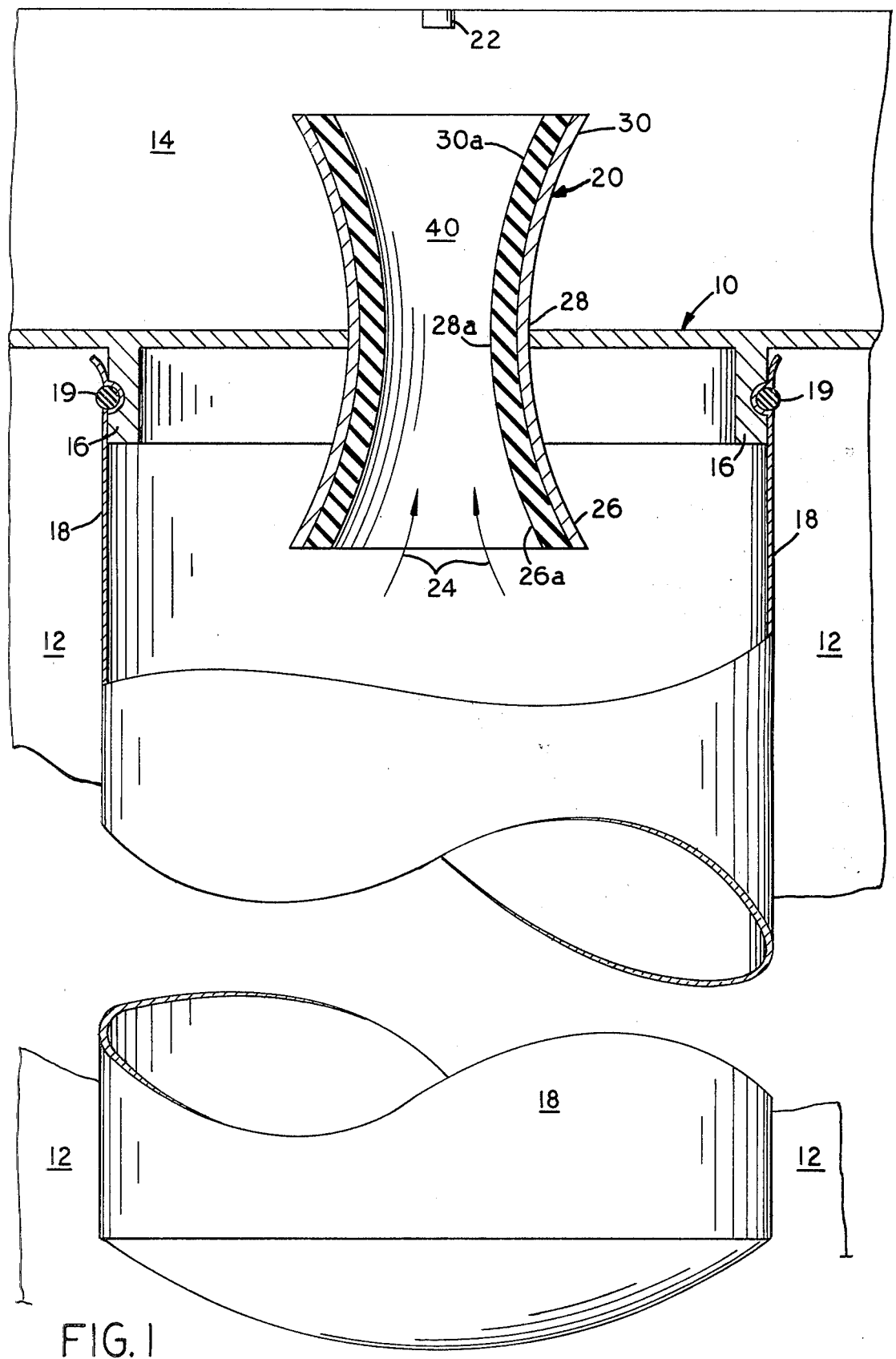

United States Patent [19]
Duyckinck

[11] 3,942,962
[45] Mar. 9, 1976

[54] PULSE JET AND VENTURI LINER
[75] Inventor: Robert W. Duyckinck, New Providence, N.J.
[73] Assignee: U.S. Filter Company, New York, N.Y.
[22] Filed: May 8, 1974
[21] Appl. No.: 467,857

[52] U.S. Cl. .................. 55/302; 55/378; 138/44; 417/195
[51] Int. Cl.² ........................................ B01D 46/04
[58] Field of Search .......... 138/44, 110, 140; 55/96, 55/302, 378, 379; 417/195

[56] References Cited
UNITED STATES PATENTS
323,458  8/1885  Smith et al. .................. 417/195

Primary Examiner—Bernard Nozick
Attorney, Agent, or Firm—Robert E. Isner

[57] ABSTRACT

A removably insertable liner of elastically deformable material sized to be disposed within and in interfacially engaged relation with the inner surface of a rigid venturi element.

1 Claim, 1 Drawing Figure

PULSE JET AND VENTURI LINER

This invention relates to pulse jet type dust collectors employing venturi elements at the open end of elongate filter tubes and particularly to venturi element modification means to selectively modify the performance characteristics of standardized pulse jet type dust collectors in accord with the exigencies of particular installations thereof.

Pulse jet type collectors are conventionally manufactured and sold in the form of generally standardized modules or sections of essentially uniform construction in a limited number of sizes and are then assembled into units of progressively increasing size in accordance with the requirements of a given installation. In the operation of such pulse jet type dust collectors, the pressure drop across the filter medium characteristically drops significantly immediately subsequent to the cleaning operation. In certain installations of such standardized units the concomitant increase in permeability of the filter media that occurs concurrently therewith results in detrimental seepage of the material to be filtered through the media, particularly where such material comprises smaller sized particulates. The above problem is accentuated by the normally rapid displacement and movement of the filter media at the end of the cleaning cycle and as the normal filter flow is resumed.

This invention may be briefly described as a selectively contourable insertable venturi liner construction for selectively modifying the performance characteristics of standardized pulse jet venturi type dust collectors.

Among the advantages of the subject invention is the readily permitted modification of the operational characteristics of pulse jet venturi dust collectors at the locus of use thereof to improve their performance as, for example, by a reduction in the amount of detrimental seepage of smaller sized particulates through the filter media of such type collectors. Another advantage is a permitted extension of the field of usage of pulse jet venturi type dust collectors of standardized character in a simple and inexpensive manner. A still further advantage is the permitted and simple modification of previously installed pulse jet venturi type dust collectors to permit high efficiency operation under changes in operating conditions.

The primary object of this invention is the provision of selectively contourable venturi liners for modifying the operational characteristics of venturi type pulse jet dust collectors.

Another object of this invention is the provision of means for improving the performance and operating characteristics of venturi type pulse jet dust collectors in the filtration of smaller sized particulates.

A further object of this invention is the provision of selectively contourable and removably insertable venturi liners for venturi elements in pulse jet type dust collectors.

Other objects and advantages of the subject invention will become apparent from the following portions of this specification and from the appended drawings which illustrate, in accordance with the mandate of the patent statutes, a presently preferred construction for insertable venturi liners incorporating the principles of this invention.

The drawing appended hereto schematically illustrates the mounting of a removably insertable venturi liner incorporating the principles of this invention is a typical pulse jet venturi type dust collector having a venturi element mounted at the end of an elongate dust collector filter sock subject to pulse jet cleaning techniques.

As schematically set forth in the drawing, which is intended to illustrate the clean gas delivery end portion of a single filter chamber in a conventional pulse jet type dust collector, there is illustrated a gas impervious tube sheet member 10 normally horizontally disposed within a perimetric housing of a dust collector and subdividing the interior thereof into a dirty air plenum chamber section 12 and a clean air plenum chamber portion 14. Such tube sheet 10 is conventionally provided with a plurality of dependent cylindrical flanges, such as 16, having the upper and otherwise open terminal end of an elongate cylindrical filter sock 18 circumferentially mounted thereon as by a spring or clamping ring 19. Such filter sock 18 is normally of considerable length and is closed at its dependent end to define a discrete filtering chamber disposed within the dirty air plenum 12 and having its interior disposed in gaseous communication with the clean air plenum chamber 14 through a venturi element 20 conventionally in the form of a metal casting or the like.

The venturi elements 20 as conventionally employed in pulse jet type dust collectors are mounted on and supported by the tube sheet 10 and define a passage for both the normal filter flow of the gaseous fluid being cleaned and for the gaseous fluid employed in pulse jet cleaning operations as would emanate from a nozzle element 22 disposed in axial co-alignment with and in spaced relation from each venturi element. In the operations of a pulse jet dust collector unit of the type described, normal filter flow will move from the dirty air plenum chamber 12, through such filter media 18 into the interior of the filter tube and then upwardly through the venturi element 10 as indicated by the arrow 24 into the clean air plenum chamber 14. As disclosed in Church U.S. Pat. No. RE 24,954, cleaning of the filter tube 18 is effected by the emission of an extremely short pulse or burst of compressed cleaning gas as a jet from the nozzle 22. The emitted jet of cleaning fluid is directed into the upper end of venturi 20 where it functions to abruptly and momentarily halt the normal filter flow 24 upwardly through such venturi element 20 and to effect an abrupt momentary pressure rise within the filter tube 18.

Commercial cost considerations dictate that the venturi elements 20 be of standardized design and construction and with the particular contouring thereof representing a compromise from optimum design as would be otherwise desired by the varying operational requirements attendant normal filter flow and cleaning operations. Considered in the direction of normal filter flow as indicated by arrows 24, such venturi elements 20 conventionally include a dependent bell-mouth portion 26 adapted to function as a converging nozzle section for normal filter flow, an intermediate throat section 28 of reduced cross-sectional dimension and an upper diffuser section generally designated 30. As mentioned earlier, venturi type dust collectors of the type described are operationally subject to a significant reduction in the pressure drop across the filter media 18 immediately subsequent to a cleaning operation. Such reduced pressure drop, as accentuated by the filter medium movement normally attendant the cleaning cycle and the resumption of normal filter flow, results in an undue amount of undesired seepage of the particulates to be filtered through the filter media, especially where small sized particulates are involved.

In accordance with the principles of this invention, a removably insertable venturi liner 40 made of elastically deformable material is provided to modify the operating characteristics of the filter. The elastically deformable character of the venturi liner 40 permits easy insertion thereof into the venturi element 20. The outer surface of such liner 40 is sized and contoured to be disposed in intimate, essentially continuous and slightly compressive interfacial engagement with the inner surface of the permanently installed venturi element so as to be effectively permanently positionable therein once its insertion has been effected. Such venturi liner 40, which is conveniently molded of readily deformable material such as neoprene rubber or other suitable synthetic resinous material, will desirably have its inner surface selectively contoured to provide for improved operational characteristics in accord with the exigencies of a given installation. By way of example, where an increase in pressure drop across the media is desired such may be obtained by a reduction in venturi throat diameter. Such venturi liner 40 may also be selectively contoured to provide for non-uniform wall thickness to effectively modify any portion of the venturi passage or conduit and to thus provide a bellmouth portion 26a, a throat portion 28a and a diffuser section 30a of a configuration dictated by the locus of operation to change or otherwise modify the operational parameter relating to both normal filter flow operations and the cleaning operations.

Information ascertained to date has indicated that the utilization of venturi liners of the type described to effect a selective reduction in throat diameter are particularly efficacious in reducing seepage in installations where small sized particulates are being filtered. Improved operating results are also readily obtainable, for example, in instances where the initially installed pulse jet collector was of essentially standardized construction and the particular size selected represented the best available design or capacity compromise for the particular problems posed by the intended installation thereof.

Having thus described my invention, I claim:
1. In a pulse jet type dust collector for separating particulate material from a gaseous carrier thereof:
   a tube sheet dividing the interior of said dust collector into a clean gas and dirty gas plenum chambers,
   an elongated open ended tube of permeable filter media mounted on and suspended from said tube sheet for separating said particulate material from said gaseous carrier by permitted passage of the latter therethrough from the outside to the inside of the filter media,
   a rigid venturi element of non-deformable material and of a first predetermined configuration mounted on said tube sheet and disposed in the open end of said tube of permeable filter media, said rigid venturi element defining a bore for countercurrent passage of gaseous carrier and cleaning gas therethrough having an intermediate portion of lesser transverse dimension than that of the terminal portions thereof, and whereby said configuration of said venturi element is at least in part determinative of the air flow characteristics through said permeable filter media the improvement comprising,
   an elastically deformable lining member of an external configuration complemental to that of the interior of said rigid venturi element and sized to be deformably insertable into and being retainably mounted within said rigid venturi element in intimate interfacial engagement therewith to modify the internal configuration thereof, said lining member defining a bore of second predetermined configuration for passage of cleaned gaseous carrier therethrough that is selectively contoured to modify the air flow characteristics attendant said rigid venturi element into which it is inserted.

* * * * *